United States Patent [19]

Bloomfield

[11] Patent Number: 4,512,431
[45] Date of Patent: Apr. 23, 1985

[54] WEIGHT SENSING APPARATUS EMPLOYING POLYMERIC PIEZOELECTRIC FILM

[75] Inventor: Philip E. Bloomfield, Bala Cynwyd, Pa.

[73] Assignee: Pennwalt Corporation, Philadelphia, Pa.

[21] Appl. No.: 527,145

[22] Filed: Aug. 29, 1983

[51] Int. Cl.³ .............................................. G01G 3/14
[52] U.S. Cl. ............................. 177/210 R; 177/210 C; 310/338; 310/800
[58] Field of Search ............... 177/128, 210 R, 210 C, 177/211; 310/338, 800

[56] References Cited

U.S. PATENT DOCUMENTS

| | | | |
|---|---|---|---|
| 3,801,838 | 4/1974 | Kistler | 310/338 |
| 4,216,404 | 8/1980 | Kurtz et al. | 310/338 |
| 4,258,565 | 3/1981 | Sawayama et al. | 310/338 X |
| 4,424,465 | 1/1984 | Ohigashi et al. | 310/800 X |
| 4,433,741 | 2/1984 | Ryckman, Jr. | 177/211 X |

Primary Examiner—George H. Miller, Jr.

[57] ABSTRACT

Weight sensing apparatus, typically a personal scale, employs a thin film of piezoelectric polymeric material as the transducing component for converting mechanical pressure in the form of applied weight to voltages which are digitally displayed in pounds.

8 Claims, 9 Drawing Figures

WEIGHT SENSING APPARATUS EMPLOYING POLYMERIC PIEZOELECTRIC FILM

STATEMENT OF THE INVENTION

The present invention relates to weight sensing apparatus employing a polymeric piezoelectric thin film as the transducing component.

BACKGROUND AND SUMMARY OF THE INVENTION

Present day personal scales, whether electronic, mechanical, or a combination thereof, require moving parts, such as the displacement of a coil, a moving beam, a rotating wheel wherein the rotational angle thereof is electronically sensed, and the like. Moving parts are subject to wear, which is accelerated when moisture, dust, or other harmful substances contaminate the particular parts or components, resulting oftentimes in inaccurate weight measurements.

The present invention provides a weight sensing device, typically a personal scale, characterized by an absence of movement of any parts. The device employs a thin polymeric piezoelectric film of KYNAR ®, for example, as the transducing material, a polyvinylidene fluoride trademark product of Pennwalt Corporation, Philadelphia, Pa. assignee of the present invention. The voltages generated by the piezofilm of polyvinylidene fluoride, upon application thereto of mechanical pressure, i.e., when a weight is applied to the film, are then displayed digitally, in pounds, for example, by electronic means.

The volume resistivity, $\rho$, of KYNAR ® polyvinylidene fluoride, hereinafter referred to as PVDF, is about 100 to 1,000 times greater than that of a typical ceramic piezoelectric material while the clamped dielectric constant, $\epsilon$; of PVDF is about 50 to 100 times smaller. If a charge is developed upon stress of the component equivalent to an open circuit voltage hold condition, the time constant, which determines internal leakage, will be the product of $\rho$ and $\epsilon$, which is approximately 1200 seconds for PVDF. This value is about the same or up to about 20 times of longer duration than typical ceramics. The clamped open circuit voltage output for PVDF is about 5 times greater than that of the best ceramics and is thus more sensitive. This greater sensitivity increases the signal-to-noise level very favorably. High $\rho\epsilon$ time constant of PVDF is most desirable.

Further, ceramic materials are brittle and tend to crack upon application of sudden pressures or concentrated forces placed thereon. It is appreciated that certain powdered polar ceramic materials however may be admixed with a polymer base to provide a flexible piezoelectric polymeric film. These composite materials exhibit less brittleness than pure ceramics.

DETAILED DESCRIPTION OF THE INVENTION

Figure 1:
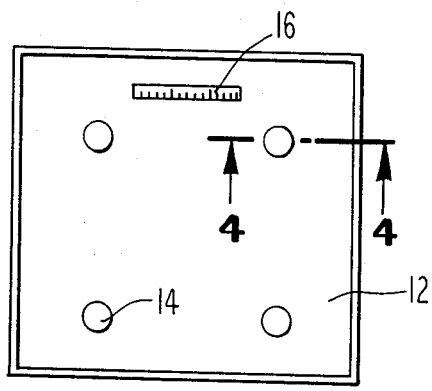
FIG. 1 is a diagrammatic plan view of the personal scale of the present invention showing relative location of the load cell assemblies and display on the scale base member, the scale platform removed for clarity of illustration.

In FIG. 1, scale base member 12 supports four spaced load cell assemblies 14, each of which receives a portion of the force applied thereto when a person places one's weight on the scale platform. Each load assembly 14 includes transducing means which generates voltages from the applied forces, which voltages are converted into pounds, for example, and digitally displayed at display 16.

Figure 2:
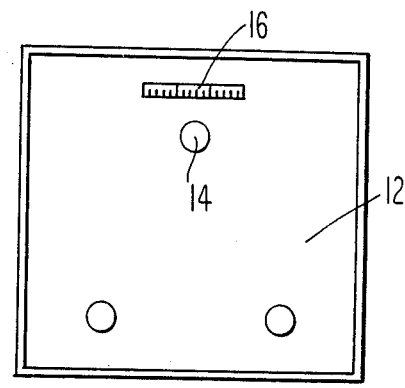
FIGS. 2 and 3 are diagrammatic plan views of modifications of the embodiment shown in FIG. 1.

In FIG. 2, three load cell assemblies 14 are illustrated, supported on base member 12 in a triangular configuration.

Figure 3:
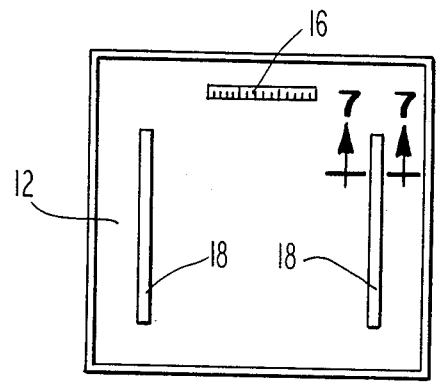

In FIG. 3, two load assemblies 18 are illustrated. Each load assembly 18 includes a transducing strip in lieu of the wafer or disc type employed in the modification of FIG. 2 or embodiment illustrated in FIG. 1.

Figure 4:
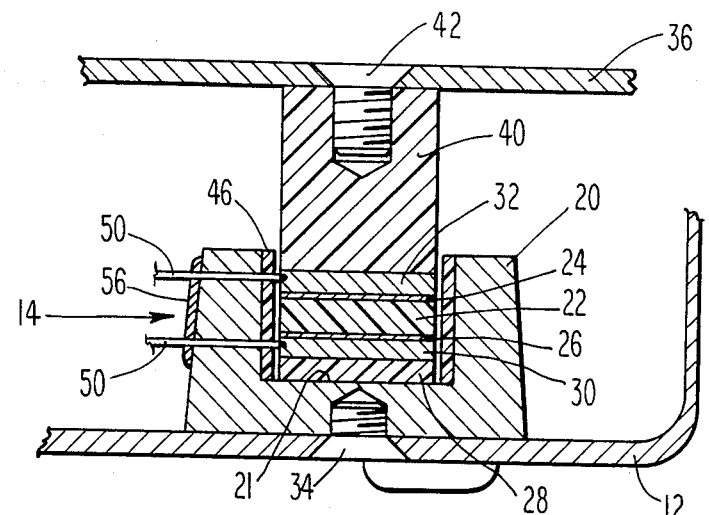
FIG. 4 is a sectional view of a portion of the scale of FIG. 1 taken along line 4—4 thereof, the scale platform included to illustrate means for applying force to the load cell assemblies.

Referring now to FIG. 4 of the drawings, each load cell assembly 14 includes a metallic well 20 having a central cavity 21 embracing therewithin piezofilm wafer 22 with suitable metallized coatings 24 and 26 conventionally applied to respective faces thereof; a plastic disc 28 having a metallic member 30 secured to the upper face thereof, the disc 28 resting at the bottom of well 20; and another metallic member 32 disposed atop metallized coating 24 of the piezoelectric film wafer 22. Wells 20 may be secured to base 12 by screw means 34.

Scale platform 36 cooperates with plug members 40, which may be secured thereto by screws 42. Plugs 40 depend from platform 36 or are otherwise arranged therebelow. Plugs 40 are disposed in vertical alignment with cavities 21 of wells 20 to effectively transmit a person's weight placed on platform 36 onto piezofilms 22. Platform 36 is conventionally maintained in stable relationship with base 12 by spring means (not shown).

An annular plastic liner 46 may be disposed along the walls of cavity 21 to prevent metallic members within the cavity from contacting metallic well 20.

Electrically shielded coaxial cables 50 are in electrical contact with metallized coatings 24 and 26 of piezofilm 22. More specifically, a shielded cable 50 may each conveniently be affixed to metallic member 30 and to metallic member 32.

Figure 9:
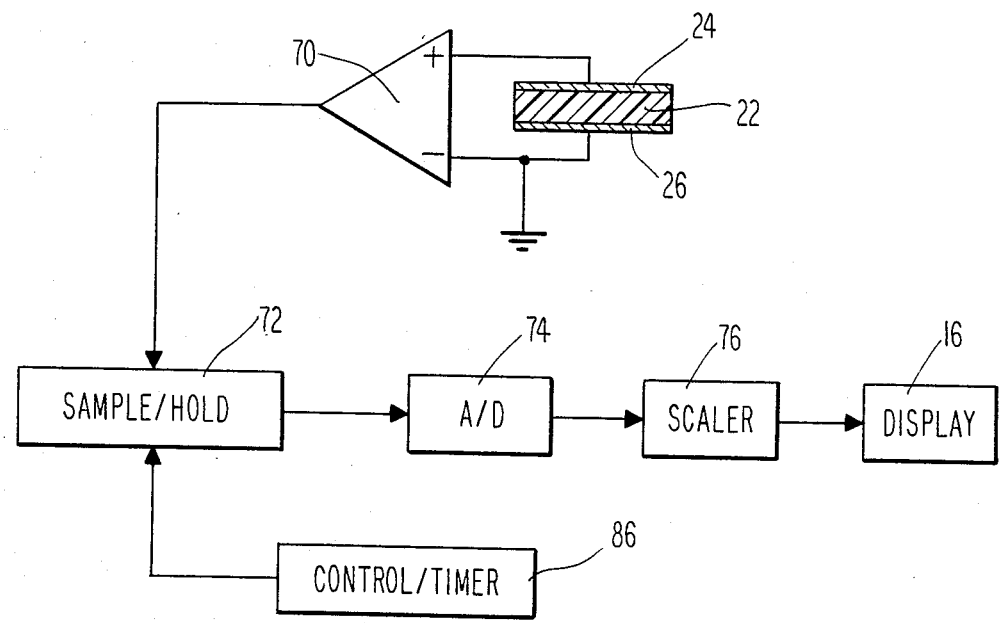
FIG. 9 is a schematic diagram of electronic means employed for converting voltages generated by the piezofilm into display signals.

It is necessary that the high impedance piezofilm 22 be shielded from the electronic components of FIG. 9 and the environment. The piezofilm is susceptible to picking up extraneous signals not only from the aforementioned components shown in FIG. 9, but from the environment to thereby generate false signals. Accordingly, piezofilm 22 is shielded from unwanted signals by being disposed in cavity 21 of the grounded metallic well member 20, although the well 20 could optionally comprise carbon impregnated plastic, plastic coated with metal or metal foil, electrically conducting polymeric materials, and the like. Cables 50 are already shielded and protected as shown in FIG. 4.

Well 20 may be provided with one or two orifices for the passage of shielded cables 50 therethrough. Alternatively, well 20 may be provided with an elongated vertical slot 52 (FIGS. 5 and 6) for the purpose of facilitating the assembly of coated piezofilm 22 and metallic members 30 and 32 with shielded cables 50 secured thereto in cavity 21. An ohmic contact 56, soldered or screwed into well 20, receives shielded cables 50 after passing through slot 52. Suitable passageway means, of course, will be provided in liner 46.

The polymeric polarized piezofilm wafer 22 is preferably KYNAR®; a polyvinylidene fluoride tradmark product of Pennwalt Corporation, Philadelphia, although copolymers of vinylidene fluoride have been found to work satisfactorily. Piezofilm 22 contains predominantly oriented $\beta$ form crystallites, thereby imparting a large net remanent polarization to the film resulting in its high piezoelectric and pyroelectric activites.

All plastic members typically comprise polytetrafluoroethylene or polypropylene, for example, but may conveniently be made from a suitable metal.

Figure 5:
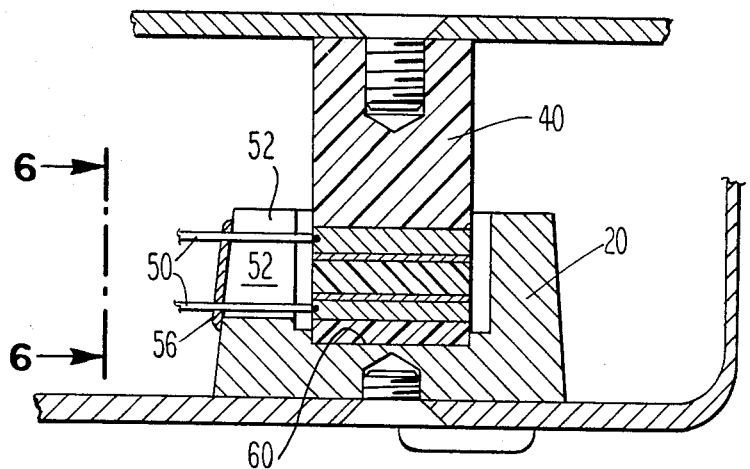
FIG. 5 is a sectional view of a modification of apparatus shown in FIG. 4.
Figure 6:
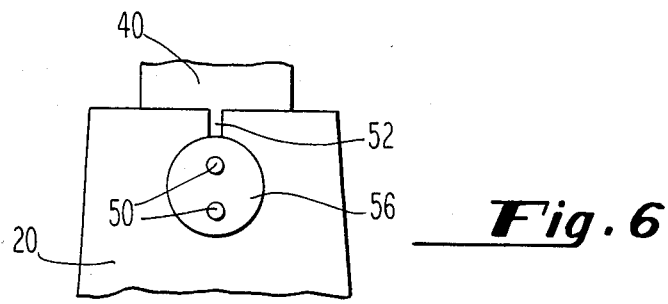
FIG. 6 is an elevational view of FIG. 5 looking in the direction of arrows 6—6.

In FIG. 5, no insulating liner 46 is needed due to the presence of recess 60, centrally disposed in well 20 at the bottom of cavity 21, which recess maintains the load cell assembly members within cavity 21 spaced from grounded well member 20.

Since slot 52 and portions of the opening to cavity 21 remain unprotected, any suitable electrically conducting closure, for example, metallic foil, may be employed thereat to prevent stray signals from entering the cavity.

Figure 7:
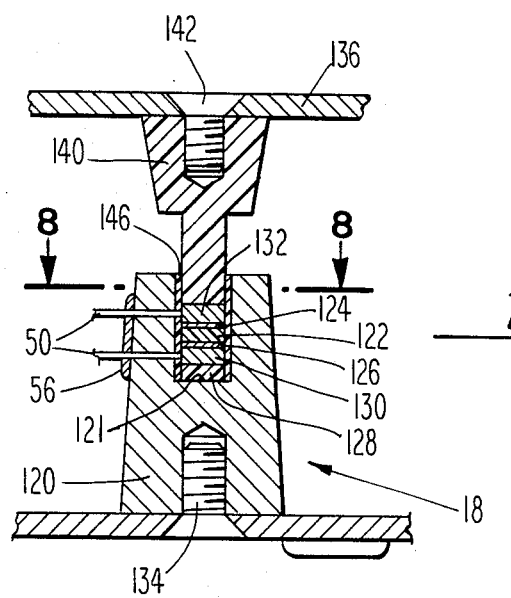
FIG. 7 is a fragmentary sectional view of the scale apparatus of FIG. 3 taken along line 7—7 thereof.

In FIG. 7, strip load cell assembly 18 comprises an elongated metallic well member 120 having a central longitudinal cavity 121 which embraces therewithin piezoelectric film strip 122 having suitable metallized coatings 124 and 126 conventionally applied to respective faces thereof; a plastic strip 128 having a metallic member 130 secured to the upper face thereof; and another metallic member 132 disposed atop metallized coating 124. Wells 120 may be secured to base 12 by a plurality of screws 134, for example.

Figure 8:
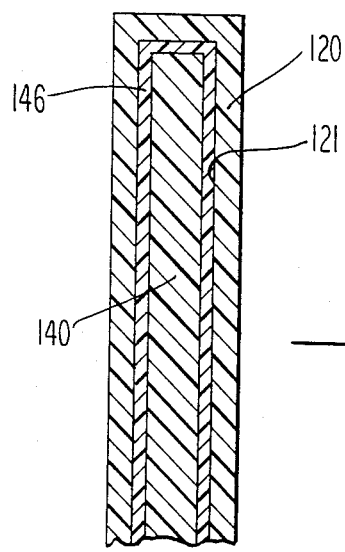
FIG. 8 is a sectional view of FIG. 7 taken along line 8—8 thereof.

Scale platform 136 is provided with a pair of elongated, parallel disposed bar members 140 secured thereto, typically by screw means 142. Bar members 140 depend from platform 136 or are otherwise arranged therebelow. Bar members 140 are disposed in vertical alignment with cavities 121 of wells 120. An elongated plastic liner 146 is preferably disposed along the entire wall of cavity 121 (FIG. 8). Shielded coaxial cables 50 and ohmic contact 56 are employed as aforedescribed.

The materials comprising the modified structure illustrated in FIG. 7 may be identical with those employed with reference to FIG. 4; similarly, slotting of the well members 120 and recessing of cavities 121 may be appropriate.

In each of the structures abovedescribed, all piezoelectric film elements are maintained in a prestressed condition by conventional spring means articulating between the platform and base. Weight placed on the platform is transmitted to the piezofilm sensing elements in a compressive mode rather than in a shear mode.

Referring now to FIG. 9 of the drawings, electronic means capable of converting voltage outputs to display data are known. In the present application, voltage outputs are generated by piezofilm 22, (or piezofilm 122 of FIG. 7), which outputs are directly proportional to weight applied thereon. When the scale is inactive, piezofilm 22 is maintained in a shorted-out condition. The display 16 is activated by a switch (not shown). This switch may be manually externally set, or if internally disposed, will respond instantaneously to a selected predetermined pressure, as when a person starts to position one's self on platform 36. Simultaneously automatically therewith, piezofilm 22 is caused to be set in an open circuit condition, and a very few seconds thereafter, controller-timer 86 is activated which may cause a signal to be flashed at display 16 to the person standing on the platform to remain still, such as "WEIGHING—DON'T MOVE", indicating that voltages generated by the sensing piezofilm 22 are to be monitored. Typically, a 220 pound person might cause piezofilm wafer 22 or strip 122 to generate about two volts. Strip 122 is conveniently about 178 mm long×3 mm wide×0.2 mm thick. Wafer 22 may be of identical thickness and area.

The voltage thus generated is fed into a high impedance buffer 70 which continuously monitors the generated voltage. The monitored voltages are sampled and held by a conventional sample/hold 72. Measuring the sampled voltage is readily accomplished by means of an electronic switch within sample/hold 72, which switch functions to close the open circuit to thereby effect the instantaneous measurement of the voltage being held under open circuit conditions on piezofilm sensor 22. The measured voltage may then be fed into an A/D converter 74 for subsequent scaling or conversion into pounds, for example, by scaler 76. The weight of the person is then displayed at display 16.

When the scale is weighting or measuring, voltages generated by the separate piezofilm transducers are serially connected, i.e., the metallized coating of one polarity is serially connected to the metallized coating of opposite polarity of an adjacent piezofilm. When the scale is in a shorted-out condition, the positive polarities of each metallized coating of each piezofilm are connected together as well as the negative polarities of each coating.

The present invention contemplates the use of a single piezofilm sensor disposed substantially centrally on base member 12 wherein a plurality of lever arms concentrate a predetermined portion of the person's weight to the sensor.

The means employed for converting the voltages into display signals are known, as abovementioned, and are not specifically claimed herein.

Piezofilms 22 or 122 possess pyroelectric as well as piezoelectric properties. Automatic temperature compensation means adjacent the piezofilm may readily be achieved via suitable shielded transistors and thermistors, well known in the industry. Further, in the process of manufacturing the piezofilm, known annealing steps may be incorporated to improve its heat stability. Additionally, conventional thermal shielding is well known and may be employed with the coated piezofilm of the present invention.

It is understood that the invention is not intended to be limited to the exact construction and circuitry details shown and described, since obvious modifications, for example to the piezofilm sensors and their cooperative arrangement with the plug and bar members, will occur to a person skilled in the art.

I claim:

1. Weight sensing apparatus comprising a base member, and a platform spaced thereabove for accepting weight placed thereon, said base member having a plurality of spaced apart cavity-forming wells mounted thereto, said wells being substantially symmetrically disposed on said base member, said platform having a plurality of members depending therefrom for mating engagement within each of said well cavities, sensing means disposed within said cavities and adapted to receive mechanical pressure from said mating members, said sensing means transducing said mechanical pressure to electrical responses, means for applying said pressure to said mating members, converting means for transforming said electrical responses to a digital display, said sensing means and converting means being devoid of moving components, said sensing means comprising a transducer of polymeric piezoelectric film of polarized polyvinylidene fluoride, and wherein said polymeric film is provided with a metallized coating on both faces thereof, each of said metallized coatings being in electrical contact with ungrounded metallic members, said coated piezofilm and said ungrounded metallic members forming a piezofilm assembly, and said piezofilm assembly being surrounded and spaced from grounded metallic members.

2. Apparatus of claim 1 wherein said polymeric film comprises polarized copolymers of vinylidene fluoride.

3. Apparatus of claim 1 wherein each of said wells is metallic, said well cavities each having an electrically insulating liner disposed therewithin, said piezofilm assembly being disposed substantially concentrically within each of said liners.

4. Apparatus of claim 1 wherein each of said activity forming wells is elongated, and said mating members are configured to matingly engage said cavities.

5. Apparatus of claim 1 wherein each of said wells is provided with a centrally disposed recess at a bottom portion of each of said cavities, and each of said piezofilm assemblies is maintained in spaced relationship with its well by engaging said recess.

6. Apparatus of claim 5 wherein said piezofilm assemblies are in constant contact with said mating member.

7. Apparatus of claim 1 wherein said converting means comprises means for measuring response voltages developed on said piezoelectric films in response to said mechanical pressure applied thereto.

8. Apparatus of claim 7 wherein said means for measuring said response voltages comprises means for placing said transducers into shorted condition for providing zero electrical voltage thereon prior to said mechanical pressure being applied thereto, other means for developing an open-circuited condition on said transducer for permitting said response voltages to be developed thereon, still other means for summing said response voltages, and additional means for transferring said developed summed response voltages into voltage sensing means.

* * * * *